(12) United States Patent
Gosis et al.

(10) Patent No.: US 8,070,358 B2
(45) Date of Patent: Dec. 6, 2011

(54) SYSTEM AND METHOD FOR CONTROLLING TEMPERATURE INDICATORS

(75) Inventors: Anatoly Gosis, Palatine, IL (US); Shannon B. Reading, Easton, PA (US); Joseph E. Fabin, Elmwood Park, IL (US); Frank Otte, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 758 days.

(21) Appl. No.: 11/548,355

(22) Filed: Oct. 11, 2006

(65) Prior Publication Data

US 2008/0089386 A1      Apr. 17, 2008

(51) Int. Cl.
*G01K 1/00* (2006.01)
*G01K 11/12* (2006.01)
*G01K 13/00* (2006.01)

(52) U.S. Cl. ........ 374/208; 374/100; 374/140; 374/162; 116/216

(58) Field of Classification Search .................. 374/100, 374/101, 162, 140, 208, 187, 198, 199, 102, 374/103, 104, 105, 106, 163, 183, 141; 116/216
See application file for complete search history.

(56) References Cited

U.S. PATENT DOCUMENTS

| | | | |
|---|---|---|---|
| 1,603,713 A | 10/1926 | Peterson | |
| 1,983,728 A | 12/1934 | Bafetti | |
| 2,020,676 A | 11/1935 | Ellis et al. | |
| 2,523,691 A * | 9/1950 | Fitch | 374/157 |
| 2,764,023 A * | 9/1956 | Vonnegut | 374/138 |
| 2,875,614 A * | 3/1959 | Dobrin et al. | 374/203 |
| 3,057,072 A | 10/1962 | Kohlmeier | |
| 3,125,993 A | 3/1964 | Zepell | |
| 3,183,892 A | 5/1965 | Malm | |
| 3,447,071 A * | 5/1969 | Beckman et al. | 324/464 |
| 3,630,080 A * | 12/1971 | Taylor | 73/861.64 |
| 3,785,336 A | 1/1974 | Roszkowski | |
| 3,933,149 A * | 1/1976 | Salera et al. | 600/549 |
| 3,935,743 A | 2/1976 | Brodie et al. | |
| 4,075,035 A | 2/1978 | Trevedy | |
| 4,120,818 A | 10/1978 | Swindells et al. | |
| 4,436,032 A | 3/1984 | van Ouwerkerk | |
| 4,467,815 A * | 8/1984 | O'Brien et al. | 600/553 |
| 4,554,565 A | 11/1985 | Kito et al. | |
| 4,588,307 A * | 5/1986 | Palti | 374/170 |

(Continued)

FOREIGN PATENT DOCUMENTS

FR      2680471 A1 *   2/1993

(Continued)

OTHER PUBLICATIONS

PCT Search Report dated Apr. 14, 2009. pp. 1-2.

(Continued)

*Primary Examiner* — Gail Verbitsky
(74) *Attorney, Agent, or Firm* — Quarles & Brady LLP (57) ABSTRACT

A system and method for controlling a temperature indicator stick includes a housing having an interior configured to receive the temperature indicator stick configured to indicate a predetermined temperature through a physical change or a chemical when exposed to the predetermined temperature. A gear is supported by the housing that extends from beyond an exterior of the housing into the interior of the housing to engage the temperature indicator stick. Accordingly, rotation of the gear from the exterior causes a retraction or advancement of the temperature indicator stick to and from the interior of the housing.

21 Claims, 3 Drawing Sheets

U.S. PATENT DOCUMENTS

| | | | | |
|---|---|---|---|---|
| 4,777,828 | A * | 10/1988 | Ferris | 73/744 |
| 4,875,782 | A | 10/1989 | Fox | |
| 4,963,194 | A * | 10/1990 | Mele | 136/221 |
| 5,011,445 | A | 4/1991 | Nakasuji et al. | |
| 5,318,372 | A | 6/1994 | Besthorne | |
| 5,401,100 | A | 3/1995 | Thackston et al. | |
| D360,223 | S | 7/1995 | Lamber | |
| 5,499,597 | A | 3/1996 | Kronberg | |
| 5,584,578 | A * | 12/1996 | Clauss, Jr. | 374/140 |
| 5,622,137 | A | 4/1997 | Lupton et al. | |
| 5,682,682 | A | 11/1997 | Renfrew et al. | |
| 5,918,981 | A | 7/1999 | Ribi | |
| 5,932,318 | A | 8/1999 | Uchiyama | |
| 6,008,757 | A | 12/1999 | Boulianne et al. | |
| 6,022,648 | A | 2/2000 | Jacobson et al. | |
| 6,039,177 | A * | 3/2000 | Swanson et al. | 206/306 |
| 6,113,520 | A | 9/2000 | Greiner | |
| 6,227,703 | B1 * | 5/2001 | DiMatteo et al. | 374/208 |
| 6,228,804 | B1 | 5/2001 | Nakashima | |
| 6,231,230 | B1 | 5/2001 | Baldock et al. | |
| 6,361,839 | B1 | 3/2002 | Salgado et al. | |
| 6,536,306 | B1 * | 3/2003 | Harris | 81/3.09 |
| 6,547,470 | B2 | 4/2003 | Leggs | |
| 6,712,996 | B2 | 3/2004 | Wu et al. | |
| 6,786,897 | B2 * | 9/2004 | Mc Ie et al. | 606/1 |
| 6,857,777 | B2 | 2/2005 | Desai et al. | |
| 6,960,043 | B2 | 11/2005 | Deonarine | |
| 7,213,969 | B2 | 5/2007 | Russak et al. | |
| 7,316,506 | B2 * | 1/2008 | Deonarine | 374/208 |
| 7,374,335 | B2 * | 5/2008 | Gotthold et al. | 374/161 |
| D573,043 | S * | 7/2008 | Knight | D10/57 |
| 7,465,086 | B1 * | 12/2008 | Foreman, Jr. | 374/143 |
| 7,494,465 | B2 * | 2/2009 | Brister et al. | 600/309 |
| 7,507,025 | B2 * | 3/2009 | Lumpkin | 374/208 |
| 7,520,668 | B2 | 4/2009 | Chen | |
| 7,530,751 | B2 | 5/2009 | Journe | |
| 2003/0013985 | A1 * | 1/2003 | Saadat | 600/549 |
| 2003/0076868 | A1 | 4/2003 | Desai et al. | |
| 2003/0076869 | A1 | 4/2003 | Deonarine | |
| 2003/0077112 | A1 | 4/2003 | Deonarine | |
| 2003/0120171 | A1 * | 6/2003 | Diamantopoulos et al. | 600/549 |
| 2003/0147450 | A1 | 8/2003 | Witonsky et al. | |
| 2004/0240520 | A1 | 12/2004 | Faries et al. | |
| 2004/0243021 | A1 * | 12/2004 | Murphy et al. | 600/549 |
| 2005/0273126 | A1 | 12/2005 | Beaupre | |
| 2006/0008699 | A1 | 1/2006 | Um | |
| 2006/0121229 | A1 | 6/2006 | Nagae | |
| 2007/0047620 | A1 | 3/2007 | Lumpkin | |
| 2007/0171957 | A1 * | 7/2007 | Harris | 374/121 |
| 2010/0106169 | A1 | 4/2010 | Niese et al. | |

FOREIGN PATENT DOCUMENTS

| | | |
|---|---|---|
| GB | 1481676 A | 8/1977 |
| WO | 2008045155 A | 4/2008 |

OTHER PUBLICATIONS

United States Patent and Trademark Office, Office Action Summary and Detailed Action, U.S. Appl. No. 12/034,956, Apr. 28, 2010, 8 pages.

United States Patent and Trademark Office, Office Action Summary and Detailed Action, U.S. Appl. No. 12/034,956, Sep. 28, 2010, 6 pages.

United States Patent and Trademark Office, Office Action Summary and Detailed Action, U.S. Appl. No. 12/034,956, Dec. 9, 2010, 7 pages.

Tempilstik Temperature Indicators Product Specifications Guide, Tempil, Inc., catalog, www.tempil.com/productdisplay.asp., U.S.A., Aug. 30, 2006.

PCT International Search Report, Nov. 10, 2006.

* cited by examiner

SYSTEM AND METHOD FOR CONTROLLING TEMPERATURE INDICATORS

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to temperature indicators and, more particularly, to a system and method for controlling temperature indicator sticks by allowing an individual to extend and retract a temperature indicator stick quickly and easily.

Various temperature detection monitors are used in the welding, metal fabrication, and heat treatment industries to measure temperatures of materials. Determining surface temperatures is important during welding and metal fabrication processes, such as pre-heat and post-weld heat treatment. Temperature monitoring is also important for determining operating temperatures of various mechanical, electrical, and hydraulic systems and components.

Temperature indicating sticks are commonly used to measure temperature. The sticks are often enclosed within a protective housing that includes an adjustable holder for positioning the temperature indicator stick relative to the housing. These adjustable holders use gravity and a fixable collet to adjust and fix the position of the temperature indicator stick with respect to the housing. These holder systems are somewhat limited in their ability to accurately control the position of the temperature indicator stick with respect to the housing or to fix the temperature indicator stick in a desired position. For example, an operator is typically required to use one hand to hold the housing and/or temperature indicator stick and the other hand to manipulate the collet. Hence, both of the operator's hands must be dedicated to adjusting the temperature indicator stick. In the case of the welding, metal fabrication, and heat treatment industries, this often means that the operator must remove heat-resistant gloves to manipulate the temperature indicator stick.

Additionally, when the temperature indictor stick is applied to the workpiece, the pressure exerted on the stick during marking often causes the stick to retract into the housing. In this case, the operator must again dedicate both hands to repositioning the temperature indicator stick before continuing to mark the object.

Accordingly, some operators are inclined to remove the temperature indicator stick from the housing. However, without a housing and holder, the relatively fragile or brittle temperature indicator stick can be easily broken. Furthermore, the housings typically include labeling that identifies the particular temperature rating of the temperature indicator stick. In this case, when the temperature indicator stick is removed from the housing, it may become indistinguishable from other temperature indicator sticks, even though the sticks are designed to indicate different temperatures.

Therefore, it would be desirable to have a system and method for quickly and easily controlling the position of a temperature indicator stick with respect to an associated housing.

BRIEF SUMMARY OF THE INVENTION

The present invention overcomes the aforementioned drawbacks by providing a system and method for accurately adjusting the position of a temperature indicator stick with respect to an associated housing that can be controlled using only a single hand, even when wearing gloves or the like. Furthermore, the system and method is designed to protect against inadvertent repositioning of the temperature indicator stick.

In accordance with one aspect of the present invention, a system is disclosed for controlling a temperature indicator stick configured to indicate a predetermined temperature through a physical or chemical change when exposed to the predetermined temperature. The system includes a housing having an interior configured to receive a temperature indicator stick. A gear is supported by the housing that extends from beyond an exterior of the housing into the interior of the housing to engage the temperature indicator stick. Accordingly, rotation of the gear causes a retraction or advancement of the temperature indicator stick to and from the housing.

In accordance with another aspect of the present invention, a system is disclosed for controlling a temperature indicator stick configured to indicate a predetermined temperature through a physical or chemical change at the predetermined temperature. The system includes a housing extending along a longitudinal axis to form a substantially hollow interior along the longitudinal axis. An actuation mechanism is supported by the housing that has a rotational axis substantially perpendicular to the longitudinal axis. The system also includes a temperature indicator stick arranged within the interior of the housing that extends along the longitudinal axis and engages the actuation mechanism. As such, rotation of the actuation mechanism about the rotational axis causes linear motion of the temperature indicator stick along the longitudinal axis.

In accordance with yet another aspect of the invention, a method of manufacturing a temperature indicator that includes a temperature indicator stick configured to indicate a predetermined temperature through a physical or chemical change at the predetermined temperature is disclosed. The method includes engaging a gear with an elongated housing to extend into an interior of the elongated housing and provide access to a portion of the gear from an exterior of the elongated housing. The method also includes arranging a temperature indicator stick within the interior of the elongated housing to engage the gear so that rotation of the gear from the exterior of the elongated housing adjusts a position of the temperature indicator stick with respect to the elongated housing.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
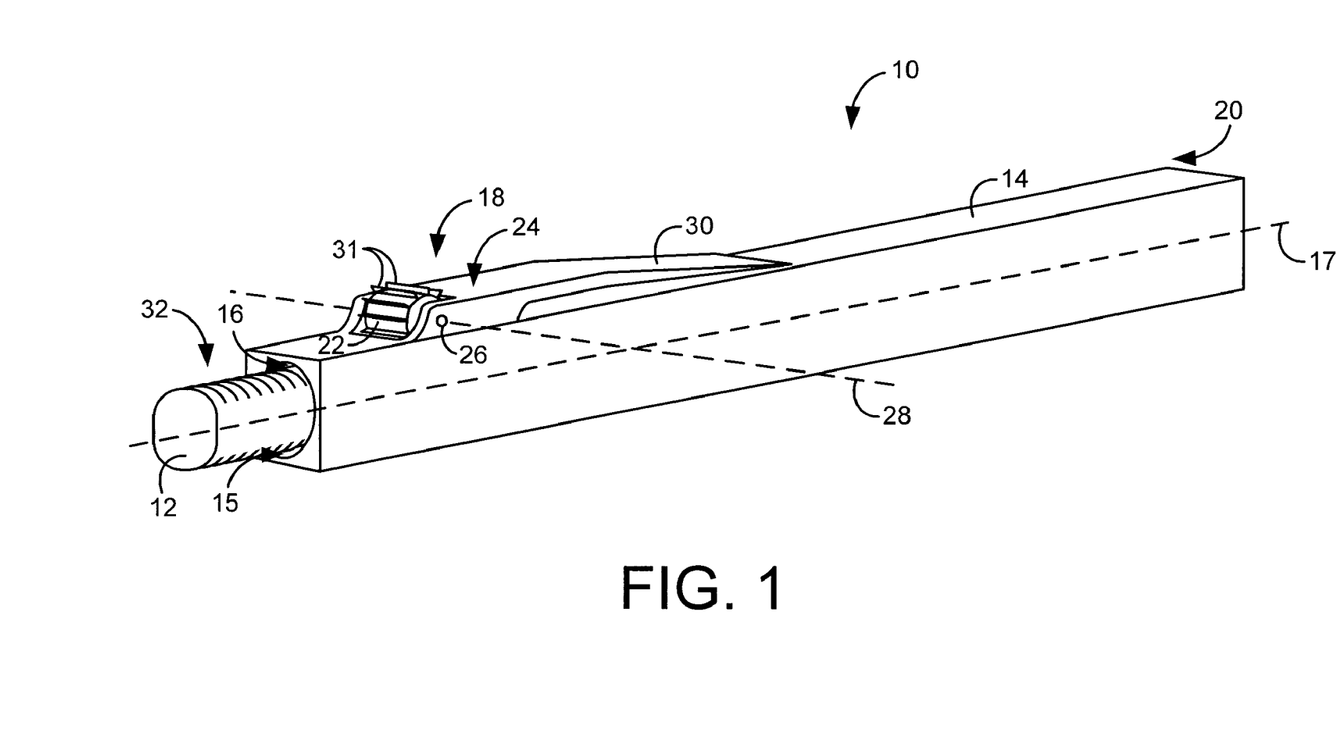
FIG. 1 is a perspective view of a temperature indicating system in accordance with the present invention.

Referring now to FIG. 1 a temperature indicator system 10 includes temperature indicator stick 12 that is arranged at least partially within a housing 14 through an opening 15 formed in the housing 14. In particular, the stick 12 is an elongated member that extends through an interior 16 of the housing 14 along a longitudinal axis 17 of the housing 14. The housing 14 is designed to protect the temperature indicator stick 12 from accidental or superficial damage. As will be described in detail below, the temperature indicator stick 12 is formed from a material that is designed to undergo a physical or chemical change when subjected to a predetermined temperature to, thereby, indicate the predetermined temperature. For example, the temperature indicator stick 12 may melt or change colors when subjected to a predetermined temperature.

Such temperature indicator sticks 12 are often formed of a relatively brittle or fragile material that is susceptible to cracking, breaking, or other damage. In this regard, the housing 14 may be formed of a ridged material designed to protect the temperature indicator stick 12 from damage. For example, the housing 14 may be formed from a metal, such as aluminum, steel, or brass, or may be a plastic-type material.

A control system 18 is included that extends along a portion of the exterior 20 of the housing 14. The control system 18 is designed to provide easy and accurate control of the position of the temperature indicator stick 12 with respect to the housing 14, even when controlled by a single hand.

Figure 2:
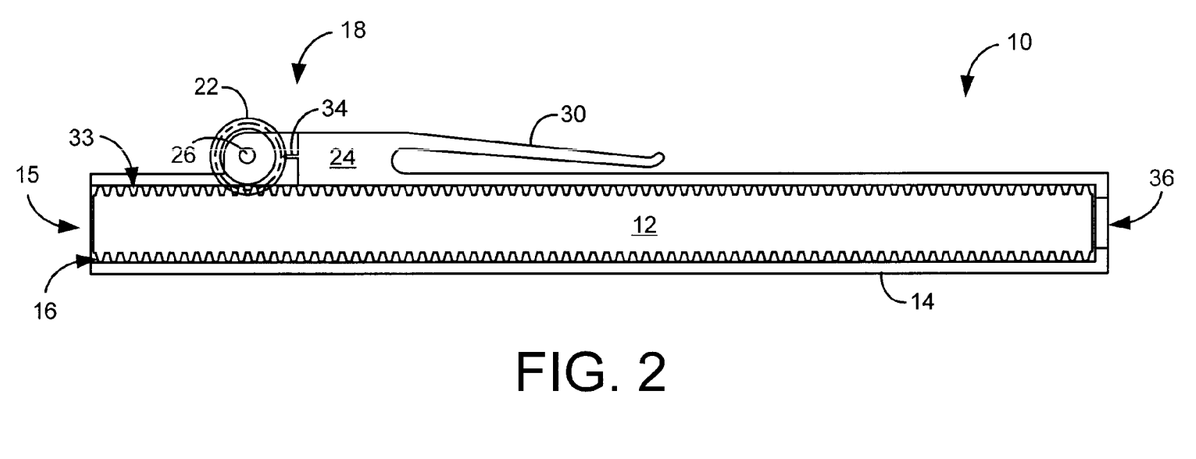
FIG. 2 is a side-elevational, cross-sectional view of the temperature indicating system of FIG. 1.

Referring to FIGS. 1 and 2, the control system 18 includes an actuation mechanism in the form of a gear 22 that is supported in an opening 23 in the housing 14 by a mounting extension 24 that rises above the housing 14. The mounting extension 24 partially surrounds the opening 23 in the housing 14 and receives a pin 26 that extends through opposing sides of the mounting extension 24 to support the gear 22 along a rotational axis 28 extending transversely, and substantially perpendicular, to the longitudinal axis 17 of the housing 14. Hence, the gear 22 extends into the interior 16 of the housing 14 to engage the temperature indicator stick 12 and extends above the housing 14 and mounting extension 24 to present, as will be described in detail below, a means to easily and accurately control the position of the temperature indicator stick 12 within the housing 14. Extending from the mounting extension 24, away from the gear 22, is an optional clip 30 that is designed to facilitate mounting the temperature indicator system 10 on clothing or other devices The gear 22 includes a plurality of teeth 31 designed to engage a textured portion 32 of the temperature indicator stick 12. In accordance with one embodiment, it is contemplated that the textured portion 32 includes a plurality of reciprocal teeth 33 that form a rack extending along at least one side of the temperature indicator stick 12. However, as will be described below, the temperature indicator stick 12 and the textured portion 32 may include a variety of configurations and may be manufactured through a variety of methods.

The rack-and-pinion system created by the gear 22 and temperature indicator stick 12 allows a user to easily control positioning of the temperature indicator stick 12 with respect to the housing 14. For example, an operator can accurately control and adjust the position of the indicator stick 12 by rotating the gear 22 toward or away from the opening 15 through which the temperature indicator stick 12 has been loaded into the housing 14. Furthermore, this process can be readily achieved using a single hand. To do so, the housing 14 is held in the operator's hand and the thumb is used to rotate the gear 22 in the desired direction by rolling the thumb over the exposed control surface of the gear 22. In particular, by rotating the gear 22 toward the opening 15, the temperature indicator stick 12 is retracted into the housing 14 and, by rotating the gear 22 away from the opening 15, the temperature indicator stick 12 is extended from the housing 14. Thus, rotation of the gear 22 in a given direction causes reciprocal motion by the temperature indicator stick 12.

Figure 3:
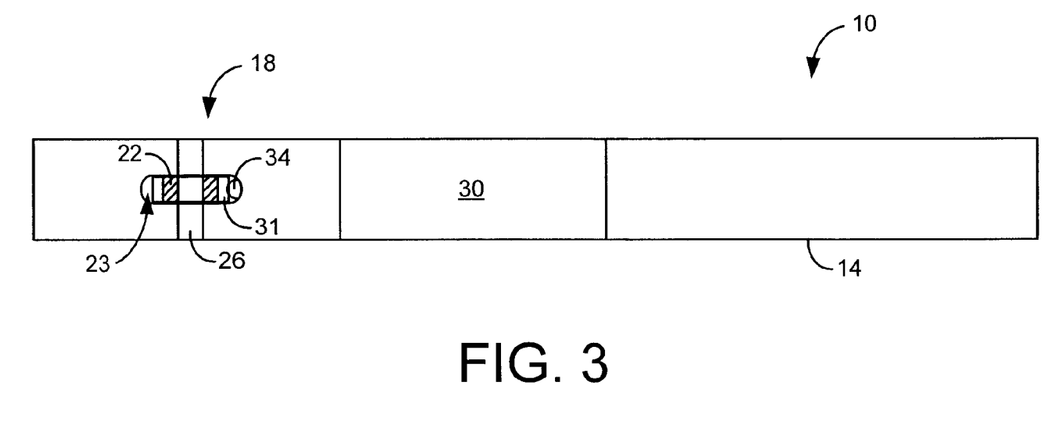
FIG. 3 is a plan view of the temperature indicating system of FIGS. 1 and 2.

Referring now to FIGS. 1-3, the temperature indicator system 10 may include a variety of optional features designed to enhance usability. For example, an indexer 34 may be included to meter extension and retraction of the temperature indicator stick 12 and to provide the operator with feedback regarding the extension and retraction of the temperature indicator stick 12. The indexer 34 may be formed as a tab that extends into the rotational arc of the gear 22. Accordingly, as the gear 22 is rotated, the teeth 31 impact the indexer 34. Upon application of a sufficient force, the indexer 34 is displaced by a tooth 31, which results in a clicking noise. The rotational resistance and/or audible clicking caused by the indexer 34 interfering with each tooth 31 as it is rotated provides feedback to the user regarding the progress of extending or retracting the temperature indicator stick 12.

Additionally, although it is contemplated that the fitting between the pin 26 and the mounting extension 24 provides sufficient friction to secure the temperature indicator stick 12 against accidental extension or retraction, the indexer 34 provides an additional frictional force against accidental or undesired movement of the temperature indicator stick 12 within the housing 14. Furthermore, due to the readily accessible position of the control system 18 along the housing 14, an operator can secure the temperature indicator stick 12 against accidental or undesired movement, such as when marking a surface, by restricting rotation of the gear 22 using the operator's thumb or a finger. Advantageously, all of these operations can be performed even when the operator is wearing gloves or other apparel that would otherwise impede controlling intricate devices. While the indexer 34 is shown as extending from the mounting extension 24 to engage the gear 22, it is contemplated that the indexer may be arranged in a variety of positions to engage the gear 22. Furthermore, it is contemplated, though less preferable, that the indexer 34 may engage the teeth 33 of the temperature indicator stick 12 instead of, or in addition to, engaging the gear 22 to perform the metering and feedback functions described above.

Additionally, referring to FIG. 3, it is contemplated that the housing 14 may include an access opening 36 located opposite the opening 15 designed to allow the temperature indicator stick 12 to pass into and out of the housing 14. Unlike the opening 15 designed to allow the temperature indicator stick 12 to pass into and out of the housing 14, the access opening 36 is sized so that the temperature indicator stick 12 cannot pass therethrough. Rather, the access opening 36 is designed to provide a portal through which a temperature indicator stick 12 that has been disengaged with the control system 18 can be repositioned to reengage the control system 18. For example, after sufficient use, a temperature indicator stick 12 may be partially consumed so that the length of the temperature indicator stick 12 is significantly less than the length of the housing 14. Accordingly, the temperature indicator stick 12 could be accidentally retracted into the housing 14 a sufficient distance so that it becomes disengaged with the control system 18. That is, the shortened temperature indicator stick 12 would be located between the back wall of the housing 14 and the area where the gear 22 extends into the housing. In this case, the access opening 36 provides a portal through which an operator may extend a screw driver, welding wire, or any other sufficiently rigid and slender device into the housing 14 and push the shortened temperature indicator stick 12 back into engagement with the gear 22.

While the teeth 33 formed along the temperature indicator stick 12 are an important component that cooperates with the control system 18 to facilitate movement and control of the temperature indicator stick 12, it should be recognized that the formation of the teeth 33 along the temperature indicator stick 12 must be carefully performed. That is, as stated above, the temperature indicator stick 12 is typically formed from a material that is relatively brittle and susceptible to damage. Hence, attempts to form the teeth 33 using conventional hobbing and milling techniques would result in material fragmentation that, at best, yields a distorted tooth shape and, at worst, a significant reduction in the structural integrity of the temperature indicator stick 12. As such, conventional systems and methods for forming the teeth 33 along the temperature indicator stick 12 typically result in immediate or spontaneous breakage.

To overcome these drawbacks caused by traditional manufacturing systems and methods, it is contemplated that a pressure forming or a scraping technique may be utilized to create a temperature indicator stick 12 having a plurality of teeth 33 formed along its length to form a rack. In particular, it is contemplated that pressure forming may be utilized for mass production of temperature indicator sticks 12 having teeth 33. However, in the case of temperature indicator sticks 12 formed from highly brittle materials, scraping techniques provide increased flexibility with a decreased risk of flaws in the structural integrity of the temperature indicator stick 12.

Scraping is performed by using a tooled scraper having one or more scraping faces designed to create the desired rack profile. By traversing the scraper transversely across the temperature indicator stick 12, slowly deepening cuts are made along the surface of the temperature indicator stick 12. Preferably, the scraping movements are performed by a non-rotary motion that is designed to form the teeth 33 along one or more sides of the temperature indicator stick 12. In accordance with one embodiment, as illustrated in FIG. 1, unnecessary weakening of the structural integrity of the temperature indicator stick 12 is avoided by limiting the teeth 33 to specific faces of the temperature indicator stick 12. However, it is noted that in some cases, such as temperature indicator sticks 12 formed from less-brittle material, the teeth 33 may be formed on multiple or all sides of the temperature indicator stick 12.

Figure 4:
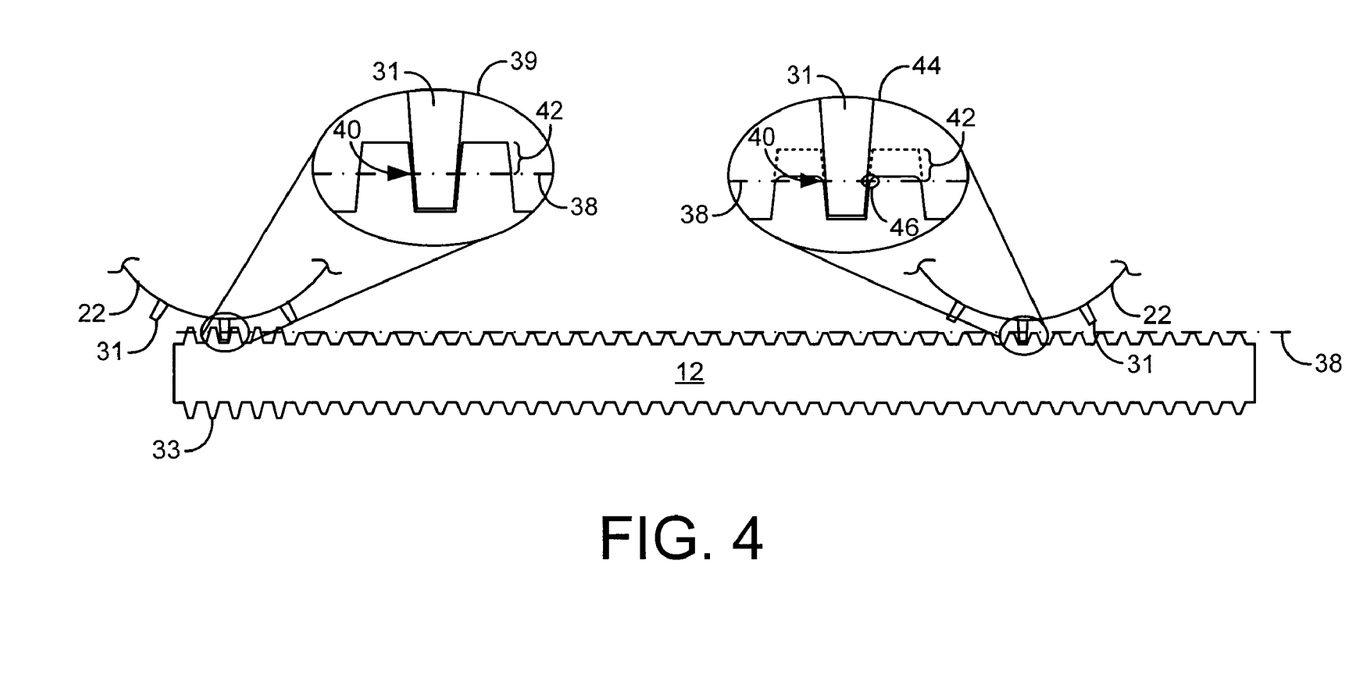
FIG. 4 is a side-elevational view of a temperature indicator stick configured as a rack and an associated gear forming a pinion to control positioning of the temperature indicator stick through the rack.

Referring now to FIG. 4, additional steps can be taken to further reduce the susceptibility of the temperature indicator stick 12 to damage along the teeth 33, such as caused by extending and retracting the temperature indicator stick 12 or, more likely, caused when using the control system 18 to hold against undesired movement of the temperature indicator stick 12, such as when marking an object with the temperature indicator stick 12. In particular, the profile of the teeth 33 can be modified to improve the strength of the teeth 33 against such damage.

A pitch line 38 can be drawn across the teeth 33 where a pitch of the teeth is measured. When the gear 22 is engaged with the teeth 33, contact between the teeth 31 of the gear 22 and the teeth 33 of the temperature indicator stick 12 occurs at a point 40 where the "pitch diameter" of the gear teeth 31 intersect the pitch line 38. Referring to a first magnified view 39, when the teeth 33 are initially formed, a portion of the teeth 33 typically extends substantially above the pitch line 38. The portion of the teeth 33 of the temperature indicator stick 12 that extends substantially above the pitch line 38 is referred to as an addendum 42. When the teeth 33 of the temperature indicator stick 12 include a substantial addendum 42, it is highly probable that a given tooth 31 of the gear 22 will first impact a tooth 33 of the temperature indicator stick 12 above the pitch line 38, on the addendum 42, and "slide" down along the tooth 33 until it engages the tooth 33 along the pitch line 38. This impact of the teeth 31 of the gear 22 with the addendum 42 leads to unnecessary wear upon the temperature indicator stick 12 and can result in damage to the structural integrity of the temperature indicator stick 12, particularly, when the temperature indicator stick 12 is formed from a highly brittle material.

Therefore, as illustrated in a second magnified view 44 included in FIG. 4, it is contemplated that the addendum 42 may be substantially removed so that the teeth 33 of the temperature indicator stick 12 extend only slightly, if at all, above the pitch line 38. Furthermore, any corners 46 formed along the teeth 33 may be rounded to further reduce the probability of the teeth 31 of the gear 22 impacting the teeth 33 of the temperature indicator stick prior to reaching the pitch line 38.

The above-described systems and methods are exemplary and a variety of variations is contemplated. For example, while the teeth described above are shown as being generally rectangular or trapezoidal in shaped, it is contemplated that other shapes may be utilized. For example, instead of traditional gear teeth, a plurality of serrations may be utilized. In this case, a rack having a profile matching the serrations would be included on the temperature indicator stick. Typically, serrations would form a profile of shallow triangles, similar to a thread cross-section or knurling. Additionally, instead of rigid gear teeth, it is contemplated that teeth may be over-molded in a soft urethane that is designed to flexibly engage the temperature indicator stick and drive the stick through a frictional force, as opposed to an interlocking gear and pinion arrangement. Hence, within this arrangement, the temperature indicator stick could be smooth along its interface with the gear so that as the gear is rotated, the soft teeth flex as they engage the temperature indicator stick and propel the stick by friction. Likewise, any of these and the above-described features could be combined.

Therefore, the above-described system and method facilitates the creation of a temperature indicator stick 12 having a plurality of teeth 33 extending along its length to form a rack. The above-described manufacturing systems and methods allow such a temperature indicator stick 12 to be created without weakening the structured integrity of the temperature indicator stick. When coupled with the above-described control system 18, a temperature indicator system 10 is created that facilitates accurate adjustment of the position of a temperature indicator stick 12 with respect to the associated housing 14. As such, the system 10 can be controlled using only a single hand, even when wearing gloves or the like.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A temperature indicator device to indicate a predetermined temperature when exposed to the predetermined temperature, the temperature indicator device comprising:

an elongated housing having a first opening at a first end and a second opening at a second end arranged opposite the first opening at the first end, and an interior extending along a first axis from the first opening to the second opening, the interior to receive a consumable temperature indicator stick, the temperature indicator stick to indicate a temperature of at least one of a welding, metal fabrication, and industrial heat treatment process;

an actuation mechanism supported by the housing and extending from beyond an exterior of the housing into the interior of the housing to engage the temperature indicator stick positioned in the interior; and wherein rotation of the actuation mechanism about a second axis that is transverse to the first axis causes at least one of retraction and advancement of the temperature indicator stick to and from the interior of the housing through the first opening at the first end and along the first axis.

2. The temperature indicator device of claim 1 further comprising a mounting extension extending from the housing to receive the actuation mechanism and arrange the actuation mechanism to extend into the interior of the housing along a first side of the actuation mechanism and extend into the exterior of the housing along a second side of the actuation mechanism.

3. The temperature indicator device of claim 2 further comprising at least one mounting clip extending from the mounting extension.

4. The temperature indicator device of claim 1 wherein the actuation mechanism engages the temperature indicator stick to frictionally drive a substantially smooth surface of the temperature indicator stick.

5. The temperature indicator device of claim 1 further comprising an indexer engaging the actuation mechanism to meter rotation of the actuation mechanism.

6. The temperature indicator device of claim 1 wherein the housing includes a third opening through which the actuation mechanism extends to engage the temperature indicator stick.

7. The temperature indicator device of claim 6 further comprising a mounting extension extending from the housing and surrounding the third opening and a pin extending through the mounting extension.

8. The temperature indicator device of claim 7 wherein the actuation mechanism is supported by the pin.

9. The temperature indicator device of claim 6 wherein the second opening at the second end arranged opposite the first opening at the first end allows manipulation of the temperature indicator stick when disengaged from the actuation mechanism.

10. The temperature indicator device of claim 1 wherein the temperature indicator stick undergoes at least one of a physical change and a chemical change when subjected to the predetermined temperature and, wherein the change includes at least one of melting and a color change.

11. A temperature indicator device to indicate a predetermined temperature, the temperature indicator device comprising:

an elongated housing extending along a longitudinal axis from a first end having a first opening to a second end having a second opening, the housing forming a substantially hollow interior along the longitudinal axis from the first end to the second end;

an actuation mechanism supported by the housing and positioned between the first end and the second end, the actuation mechanism having a rotational axis substantially perpendicular to the longitudinal axis;

a consumable temperature indicator stick arranged within the interior of the housing to extend along the longitudinal axis and engage the actuation mechanism;

wherein rotation of the actuation mechanism about the rotational axis causes linear motion of the temperature indicator stick along the longitudinal axis; and wherein the predetermined temperature is at least one of a welding, metal fabrication, and industrial heat treatment process temperature.

12. The temperature indicator device of claim 11 further comprising a resistive indexer to engage at least one of the actuation mechanism and the temperature indicator stick to meter linear motion of the temperature indicator stick.

13. The temperature indicator device of claim 11 further comprising a pin supported by the housing to extend transversely to the longitudinal axis and support the actuation mechanism.

14. The temperature indicator device of claim 11 wherein the rotational axis is substantially perpendicular to the longitudinal axis.

15. The temperature indicator device of claim 11 further comprising a mounting extension extending from the housing to receive the actuation mechanism and arrange the actuation mechanism to extend into the interior of the housing to engage the temperature indicator stick.

16. The temperature indicator device of claim 15 further comprising a pin extending through the mounting extension to form the rotational axis extending transversely to the longitudinal axis.

17. A hand-held temperature indicator device to indicate a predetermined temperature, the temperature indicator device comprising:

means for enclosing an area along a longitudinal axis to form a substantially hollow interior along the longitudinal axis and including a first opening at a first end and a second opening at a second end arranged opposite the first opening at the first end, the means for enclosing the area to receive a consumable temperature indicator stick extending along the longitudinal axis to indicate a temperature of at least one of a welding, metal fabrication, and industrial heat treatment process;

means for controlling a position of the temperature indicator stick having a rotational axis substantially perpendicular to the longitudinal axis; and wherein rotation of the means for controlling about the rotational axis causes linear motion of the temperature indicator stick along the longitudinal axis.

18. The temperature indicator device of claim 17 further comprising means for metering the position of the temperature indicator stick.

19. The temperature indicator device of claim 1 wherein the temperature indicator stick indicates a temperature of at least one of a welding, metal fabrication, and industrial heat treatment process, and is further at least partially consumed when subjected to the temperature of at least one of the welding, metal fabrication, and industrial heat treatment process.

20. A temperature indicator device to indicate a predetermined temperature when exposed to the predetermined temperature, the temperature indicator device comprising:

an elongated housing having a first opening at a first end and a second opening at a second end arranged opposite the first opening at the first end, and an interior to receive a consumable temperature indicator stick;

an actuation mechanism supported by the housing and extending from beyond an exterior of the housing into the interior of the housing to engage the temperature indicator stick positioned in the interior;

wherein rotation of the actuation mechanism causes at least one of retraction and advancement of the temperature indicator stick to and from the interior of the housing;

wherein the first opening allows the temperature indicator stick to advance out from and retract into the housing and a third opening allows the actuation mechanism to extends to engage the temperature indicator stick; and wherein the second opening arranged opposite the first opening allows manipulation of the temperature indicator stick when disengaged from the actuation mechanism.

21. A temperature indicator device to indicate a predetermined temperature, the temperature indicator device comprising:

an elongated housing extending along a longitudinal axis and including a first opening at a first end and a second opening at a second end arranged opposite the first opening at the first end, the housing forming a substantially hollow interior along the longitudinal axis from the first end to the second end;

an actuation mechanism supported by the housing and having a rotational axis substantially perpendicular to the longitudinal axis;

a consumable temperature indicator stick arranged within the interior of the housing to extend along the longitudinal axis and engage the actuation mechanism;

wherein rotation of the actuation mechanism about the rotational axis causes linear motion of the temperature indicator stick along the longitudinal axis;

a mounting extension extending from the housing to receive the actuation mechanism and arrange the actuation mechanism to extend into the interior of the housing to engage the temperature indicator stick; and a pin extending through the mounting extension to form the rotational axis extending transversely to the longitudinal axis.

* * * * *

UNITED STATES PATENT AND TRADEMARK OFFICE
CERTIFICATE OF CORRECTION

| | | |
|---|---|---|
| PATENT NO. | : 8,070,358 B2 | |
| APPLICATION NO. | : 11/548355 | |
| DATED | : December 6, 2011 | |
| INVENTOR(S) | : Anatoly Gosis et al. | |

It is certified that error appears in the above-identified patent and that said Letters Patent is hereby corrected as shown below:

Column 9, line 11 "extends" should be --extend--

Signed and Sealed this
Twenty-eighth Day of February, 2012

David J. Kappos
*Director of the United States Patent and Trademark Office*